United States Patent [19]

Yoshimura et al.

[11] Patent Number: 4,704,239

[45] Date of Patent: Nov. 3, 1987

[54] PROCESS FOR THE PRODUCTION OF EXPANDED PARTICLES OF A POLYMERIC MATERIAL

[75] Inventors: Shohei Yoshimura, Tomioka; Toru Yamaguchi, Utsunomiya; Masato Kanbe, Hiratsuka; Hideki Kuwabara, Hadano, all of Japan

[73] Assignee: Japan Styrene Paper Corp., Tokyo, Japan

[21] Appl. No.: 726,669

[22] Filed: Apr. 24, 1985

[30] Foreign Application Priority Data

Apr. 28, 1984 [JP] Japan .................................. 59-86763
May 21, 1984 [JP] Japan ................................ 59-102431

[51] Int. Cl.$^4$ ............................ C08J 9/12; C08J 9/18; C08J 9/22
[52] U.S. Cl. ................................... 264/50; 264/53; 264/DIG. 5; 264/DIG. 9; 264/DIG. 13; 264/DIG. 15; 264/DIG. 16; 425/4 R; 521/58; 521/74
[58] Field of Search .......... 264/DIG. 15, 50, DIG. 5, 264/DIG. 13, DIG. 16, DIG. 9, 53; 425/4 R; 521/58, 74

[56] References Cited

U.S. PATENT DOCUMENTS

| | | | |
|---|---|---|---|
| 2,998,386 | 8/1961 | Nickolls | 264/DIG. 15 |
| 3,126,432 | 3/1964 | Schuur | 264/DIG. 15 |
| 3,640,915 | 2/1972 | Cooper . | |
| 3,725,320 | 4/1973 | Wang | 264/DIG. 15 |
| 3,900,433 | 8/1975 | Taub et al. . | |
| 4,443,393 | 4/1984 | Akiyama et al. | 264/DIG. 15 |

FOREIGN PATENT DOCUMENTS

| | | |
|---|---|---|
| 95109A | 11/1983 | European Pat. Off. . |
| 1162572 | 9/1958 | France . |
| 56-1344 | 1/1981 | Japan . |
| 2080813 | 2/1982 | United Kingdom . |

OTHER PUBLICATIONS

Brydson, J. A. *Plastics Materials* Princeton, N.J., D. Van Nostrand, c1966, pp. 39–44, 133–143.
Frank, H. P., *Polypropylene* New York, Gordon and Breach Science Publishers, c 1968, pp. 47–63.
*Encyclopedia of Polymer Science and Technology*, vol. 9, New York, Interscience Publ., Div. of John Wiley & Sons, c 1968, Section "Morphology", p. 247.

*Primary Examiner*—Philip Anderson
*Attorney, Agent, or Firm*—Stephen F. K. Yee

[57] ABSTRACT

A process is disclosed for the production of expanded particles of polymeric material wherein unexpanded particles of the material are contacted with a nitrogen-containing inorganic gas under a first pressure condition to impregnate the particles with the gas. The gas impregnated particles are heated to a temperature higher than the softening point of the material, and dispersed into a liquid medium. The resulting dispersion is subjected to a lower pressure to expand the particles. The expanded particles may be used as prefoamed particles for the molding of foamed articles.

24 Claims, 3 Drawing Figures

PROCESS FOR THE PRODUCTION OF EXPANDED PARTICLES OF A POLYMERIC MATERIAL

BACKGROUND OF THE INVENTION

1. Field of the Invention

This invention relates to a process for the production of expanded particles of a polymeric material.

2. The Prior Art

It is known to produce a foamed article of a polymeric material by first forming pre-expanded particles of the polymeric material and, then, heating the pre-expanded particles within a mold to further expand the pre-expanded particles to a desired shape. Such pre-expanded particles may be prepared by, for example, a method disclosed in Japanese Examined Patent Publication No. 56-1344 and including the steps of: (a) providing expandable particles of a polymeric material containing a volatile organic blowing agent, (b) dispersing the particles in water contained in a closed vessel, (c) heating the dispersion to a temperature higher than the softening point of the polymeric material while maintaining the pressure within the vessel at a pressure above the vapor pressure of the blowing agent, and (d) discharging the dispersion from the vessel for subjecting same to an atmosphere maintained at a pressure lower than that within the vessel, thereby the particles discharged are expanded. Examples of the volatile blowing agent include propane, butane, heptane, hexane, cyclobutane, cyclopentane, trichlorofluoromethane and dichlorodifluoromethane.

Such a method of preparing pre-expanded particles, however, has been found to involve some problems due to the use of such volatile blowing agents. Firstly, the temperature at which the pre-expansion is performed should be limited to a specific, narrow range, since otherwise the expandable particles are swelled with the blowing agents which are good solvents for the polymeric material. Therefore, the expansion ratio which is dependent upon the expansion temperature is unavoidably limited within a narrow range. Secondly, some of these blowing agents are dangerous because of their toxicity and inflammability and require the replacement with air after completion of the pre-expansion. Such a replacement requires the recovery of the blowing agents not only because of their expensiveness but also because of their tendency to destroy the ozone layer surrounding the earth.

SUMMARY OF THE INVENTION

The present invention has been made with a consideration of the above problems of the conventional pre-expansion method in which a volatile blowing agent is used.

In accordance with the present invention, there is provided a process for the production of expanded particles, comprising the steps of:

(a) providing unexpanded particles formed of a polymeric material;

(b) contacting a nitrogen-containing inorganic gas with the unexpanded particles under a pressurized condition to impregnate the unexpanded particles with said gas, heating the unexpanded particles to a temperature higher than the softening point of the polymeric material and dispersing the unexpanded particles in a liquid dispersing medium, so that a dispersion maintained at a first pressure and containing the softened, gas-impregnated, unexpanded particles is obtained; and (c) subjecting said dispersion to a second pressure lower than said first pressure so that the unexpanded particles are expanded.

DETAILED DESCRIPTION OF THE INVENTION

Figure 1:
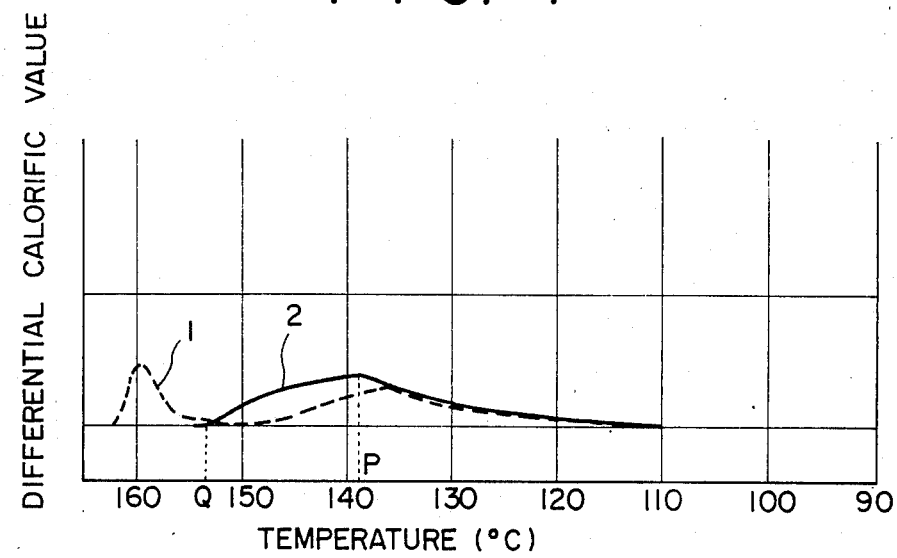
FIGS. 1 and 2 show the test results of differential scanning calorimetry techniques for the expanded particles of Example 8 and comparative Example 4, respectively.

The present invention will now be described in detail below.

Examples of the polymeric material used in the present invention include polyethylene resins such as low-density polyethylenes, high-density polyethylenes, linear low-density polyethylenes and ethylene-vinyl acetate copolymers; polypropylene resins such as propylene homopolymers, ethylenepropylene random copolymers and ethylene-propylene block copolymers; polyester resins such as aromatic polyester/polyether glycol block copolymers; polystyrene resins; polyvinyl chloride resins; thermoplastic polyurethane resins; and polyamide elastomers. Above all, the use of polyolefin resins such as polyethylene resins and polypropylene resins is preferred. The above polymeric materials may be either crosslinked or non-crosslinked and preferably have a particle size of 0.3–5 mm, preferably 0.5–3 mm.

The polymer particles mentioned above are contacted with a nitrogen-containing inorganic gas under a pressurized condition so that the polymer particles are impregnated with the nitrogen-containing gas.

The nitrogen-containing inorganic gas may contain, in addition to nitrogen, a rare gas such as argon or other inert gases such as carbon dioxide and steam. Oxygen, hydrogen, ozone or the like inorganic gases may also be incorporated into the nitrogen-containing gas in such an amount as not to inhibit the accomplishment of the objects of the present invention. It is advantageous that the nitrogen-containing gas have a nitrogen content of at least 5 vol %, more preferably at least 10 vol %. Illustrative of suitable nitrogen-containing inorganic gases are air and nitrogen gas. Conventional blowing agents are organic compounds having an affinity for the polymeric materials. In this regard, it is surprising that gaseous nitrogen which has no affinity for the polymeric materials can be effectively used as a blowing agent for the expansion thereof.

The contact of the nitrogen-containing inorganic gas with the unexpanded particles formed of the polymeric material is preferably performed at a temperature higher than the softening point of the polymeric material to be expanded. In the case of the particles formed of a non-crosslinked, crystalline polymeric material, the contact is preferably carried out at a temperature between a temperature 30° C. lower than the melting point of the polymeric material and a temperature 40° C. higher than the melting point. In the case of a crosslinked, crystalline polymeric material, the contact is preferably performed at a temperature between temperatures 20° C. lower and 120° C. higher than the melting point thereof. In the case of amorphous polymeric materials, it is preferred that the contact be performed at a temperature between temperatures 10° C. higher and 120° C. higher than the softening point. Heating of the polymer particles to a temperature above the softening point is preferably carried out gradually at a rate of 1°–10° C./min, more preferably 2°–5° C./min.

In the present specification, the term "softening point" is intended to mean a value measured in accordance with ASTM D648 with a load of 4.6 Kg/mm$^2$ and the term "melting point" is intended to refer to a value measured by differential scanning calorimetric analysis (DSC method (see "Plastics Analysis Guide", Hanser Publishers, page 264+)). In the DSC method, the sample is heated to 200°–300° C. in an atmosphere of nitrogen at a rate of 10° C./min (first heating stage) while measuring the temperature of the sample and the differential calorific value required for raising the temperature of the sample. After the sample is heated to a predetermined temperature, it is cooled to 50° C. at a rate of 10° C./min. Thereafter, the sample is heated again (second heating stage), for example, in the same manner as in the first heating stage. The melting point is a temperature (see point P in FIG. 1) at which a peak exists in the curve obtained when the results of the second heating stage are plotted with the temperature as abscissa against the differential calorific value as ordinate. When the curve has two or more peaks, the melting point represents the peak at the highest temperature. The temperature at which the curve reached the base line (see, for example, point Q in FIG. 1) is termed as "melt-completion temperature".

The pressure at which the contact of the softened polymer particles with the nitrogen-containing inorganic gas is performed is preferably at least 20 atm (absolute), more preferably 30–100 atm (absolute). The contact time varies with the pressure, temperature, the kind of the polymeric material and the intended expansion ratio but is generally 10 min. or more, preferably 20 min. or more.

The contact of the polymer particles with the nitrogen-containing gas is preferably performed while maintaining the particles in a dispersed state in a liquid dispersing medium. In this case, the impregnation of the polymer particles with the nitrogen-containing gas is effected by both direct and indirect contact of the particles with the gas. Namely, the impregnation is achieved at the interface between the gas phase and the liquid phase and by contact of the polymer particles with the liquid medium in which the nitrogen gas is dissolved.

The liquid medium in which the unexpanded polymeric particles are dispersed may include, for instance, water, ethylene glycol, glycerine, methanol, ethanol and mixtures thereof. Above all, the use of water is preferred for reasons of economy and easiness in impregnation of the particles with the nitrogen-containing gas. The dispersing medium is preferably used in an amount of at least 1.5 parts by weight, more preferably 2–5 parts by weight per part by weight of the unexpanded polymer particles.

Figure 3:
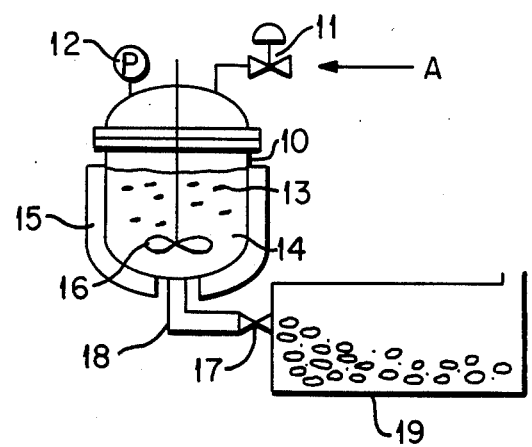
FIG. 3 is a schematic showing an example of an apparatus useful for the process of the present invention.

The formation of the dispersion containing softened, unexpanded particles of the polymeric material impregnated with the nitrogen-containing inorganic gas may be conducted in various manners. For example, and with reference to FIG. 3, a nitrogen-containing gas is introduced (arrow A) into a vessel 10 via a control valve 11, to a predetermined initial pressure, as measured by a pressure gauge 12, to which is then supplied polymer particles 13 and a dispersing medium 14, jointly or separately. The mixture within the vessel 10 is then heated by a heater 15 to a first temperture which is higher than the melting point of the polymer, and stirred by a stirrer 16, to obtain a dispersion containing softened, gas-impregnated, unexpanded particles. In an alternate instance, a dispersion of polymer particles in a liquid medium is heated to a predetermined first temperature to which is then supplied a nitrogen-containing gas while stirring the dispersion.

To prevent melt-adhesion of the polymer particles with each other during step (b), finely divided solids which do not soften or melt at a temperature at which step (b) is performed, i.e. first temperature, may be suitably added to the dispersion or mixed with the polymer particles. Illustrative of suitable solids are aluminum oxide, titanium oxide, basic magnesium carbonate, basic zinc carbonate and calcium carbonate. Organic solid particles such as urea-formaldehyde resin particles which are insoluble in the dispersion medium may also be used. Such finely divided solid particles preferably have a particle size of 0.001 to 100 μm, more preferably 0.001 to 30 μm and may be used in an amount of 0.01 to 10 parts by weight per 100 parts by weight of the polymer particles.

If desired, step (b) may be carried out in the presence of a volatile impregnating aid to facilitate the impregnation of the polymer particles with the nitrogen-containing inorganic gas and thereby to increase the expansion ratio. The impregnating aid is a compound having a boiling point of −50° to 250° C., preferably −30° to 200° C. and capable of plasticizing the polymeric material to be expanded. Illustrative or suitable impregnating aids are acetone, toluene, xylene, heptane, ethyl ether, dioxane, methyl acetate, ethyl acetate, tetrahydrofuran, a styrene monomer, an isoprene oligomer and dipentene. The amount of the impregnating aid used is preferably 0.5 to 30 parts by weight, more preferably 2 to 20 parts by weight per 100 parts by weight of the polymer particles. The impregnating aid may be supplied to the impregnating step along with the nitrogen-containing gas or as a mixture with the dispersing medium.

The resulting dispersion containing the softened, nitrogen gas-containing, unexpanded particles and maintained in a pressurized condition is then subjected to a decreased pressure condition to allow the unexpanded particles to foam and expand. Generally, the decreased pressure condition is ambient pressure. The expansion step is, in practice, effected by simply opening a valve or port 17 in an outlet 18 connected to the vessel 10 in which the impregnation has been effected, to thereby discharge the dispersion into a container 19 maintained at atmospheric pressure.

Because of the use of the nitrogen-containing inorganic gas for the expansion of polymer particles, the following advantages may accrue:

(1) The temperature at which the pre-expansion of the polymer particles is performed may be selected from a wide temperature range and the expansion ratio may be controlled to 1.5–80 times the volume of the unexpanded particles.

(2) The expanded particles obtained have uniform particle size distribution, excellent closed cell structures and excellent moldability because of the freeness of swelling of the polymer with the blowing agent.

(3) The expansion may be performed in a simple, safe, stable and economic manner without causing any environmental pollution.

(4) The expanded particles obtained need not be subjected to substitution of air for the gas contained therein and may be used as such for further expansion treatment in a mold.

In the process of the present invention, the expansion of the polymer particles may be effected using a conventional organic blowing agent in conjunction with the nitrogen-containing gas, if desired. In this case, the impregnation of the polymer particles with the organic blowing agents and the nitrogen-containing gas may be performed simultaneously or separately.

Examples of the organic blowing agent include aliphatic hydrocarbons such as propane, n-butane, i-butane, butylene, i-butene, pentane, neopentane and hexane; halogenated aliphatic hydrocarbons such as monochloromethane, monochloroethane, dichlorofluoromethane, dichlorodifluoromethane, trifluoromethane and trichlorotrifluoroethane; and alicyclic hydrocarbons such as cyclopentane and cyclohexane. These compounds may be used singly or as a mixture of two or more. Such an organic blowing agent may be suitably used in an amount of 2 to 200 parts by weight, more preferably 5 to 100 parts by weight per 100 parts by weight of the nitrogen-containing inorganic gas. The amount of the organic blowing agent is generally 20 parts by weight or less per 100 parts by weight of the polymer particles to be expanded. An amount of the organic blowing agent above the above-specified upper limit causes shrinkage or deformation of the expanded particles, resulting in the lack of uniformity in both their particle size and pore size. Further, the use of an excess amount of the organic blowing agent adversely affects the previously described advantages of the present invention. The cojoint use of the organic blowing agent and the nitrogen-containing inorganic gas may afford a synergistic effect. That is, a higher expansion ratio is obtainable by such a cojoint use as compared with the case where the organic blowing agent or the nitrogen-containing inorganic gas is used by itself. Further, the cojoint use does not necessitate the limitation of the expansion temperature to a narrow range.

The expanded particles obtained by the process of the present invention can be suitably used as such for various purposes. Especially, they are advantageously used as raw materials for the production of molded, foamed articles. For the preparation of molded articles, the expanded particles are filled in a mold and heated, for example, with steam for further expansion therewithin.

It has been found that expanded particles of a non-crosslinked polypropylene resin having secondary crystals can afford molded articles with an excellent dimensional stability. The secondary crystals are formed when the non-crosslinked polypropylene resin is subjected to a temperature between its melting point and a melt-completion temperature (secondary crystals-forming temperature region). The terms "melting point" and "melt-completion temperature" are as previously defined.

Thus, when the dispersion containing the softened, gas-impregnated, unexpanded particles of the polypropylene resin which are to be subjected to a low pressure condition for the expansion thereof is maintained at a temperature within the secondary crystals-forming temperature region, the secondary crystals can form and grow. At a temperature above the melt-completion temperature, the secondary crystals thus formed are gradually destroyed and finally disappear to become an amorphous state. The expanded particles obtained from such an amorphous polypropylene resin fails to give excellent molded articles. Therefore, when the expansion of the unexpanded particles is performed at a temperature higher than the melt-completion temperature, it is important that the dispersion containing the unexpanded particles should be previously maintained at the secondary crystals-forming temperature region for a period of time so that the secondary crystals can form sufficiently in a large amount. By this, even when the dispersion is heated to an expansion temperature higher than the melt-completion temperature, the expanded particles obtained still contains a quantity of the secondary crystals which remains undestroyed during the expansion step.

Whether or not the expanded particles produced contain the secondary crystals can be tested by differential scanning calorimetry (DSC) techniques. For this purpose, the polypropylene resin particles (1 to 3 mg) is heated at a rate of 10° C./min to 220° C. using a differential scanning calorimeter while measuring the temperature of the sample and the calorific value required for heating the sample. The results are plotted with the temperature as abscissa and the calorific value as cordinate to give a curve (first DSC curve), such as curves 1 and 3 in FIGS. 1 and 2 which are described more fully below. The heated sample is then cooled at a rate of 10° C./min to about 40° C. Thereafter, the sample is again heated in the same manner as in the first heating stage as mentioned above to give a second DSC curve, such as curves 2 and 4 in FIGS. 1 and 2. Each of the first and second DSC curves has a peak (characteristic peak) which is responsible for the absorption of heat during the melting of the resin and which is characteristic to the resin. The temperatures at the characteristic peaks in the first and second DSC curves are the same or different from each other. The difference is below 5° C., generally below 2° C., however. In addition to the characteristic peak there may be a peak (high temperature peak) in the first DSC curve at a temperature higher than that of the characteristic peak. The high temperature peak is attributed to the absorption of heat for the destruction of the secondary crystals. Thus, the existence or non-existence of the secondary crystals can be seen from the presence or absence of the high temperature peak. That is, if the first DSC curve shows substantially no such high temperature peak, then the sample is regarded as containing substantially no secondary crystals. The second DSC curve shows no such a high temperature peak because the secondary crystals if any have been destroyed during the first heating stage. It is preferred that the difference in temperature between the high temperature peak and characteristic peak of the second DSC curve be great because the greater the difference the more becomes stable the secondary crystals. The difference is preferably over 5° C., more preferably over 10° C.

Illustrative of suitable non-crosslinked polypropylene resins are polypropylene homopolymers, propylene-ethylene random copolymers, propylene-ethylene block copolymers, propylene-butene random copolymers and propylene-ethylene-butene random copolymers. Of these, the propylene-ethylene random copolymers, especially those having ethylene content of at least 1% by weight but below 10% by weight are very suited for the production of secondary crystals-containing expanded particles. Unexpanded particles of such propylene resins preferably have a particle size of 0.3 to 5 mm, more preferably 0.5 to 3 mm.

Because of the use of the nitrogen-containing inorganic gas as a blowing agent and because of the presence of the secondary crystals in the resins, the expanded particles obtained by the method of this invention have excellent moldability and give molded articles with excellent dimensional stability.

The following examples will further illustrate the present invention.

Figure 2:
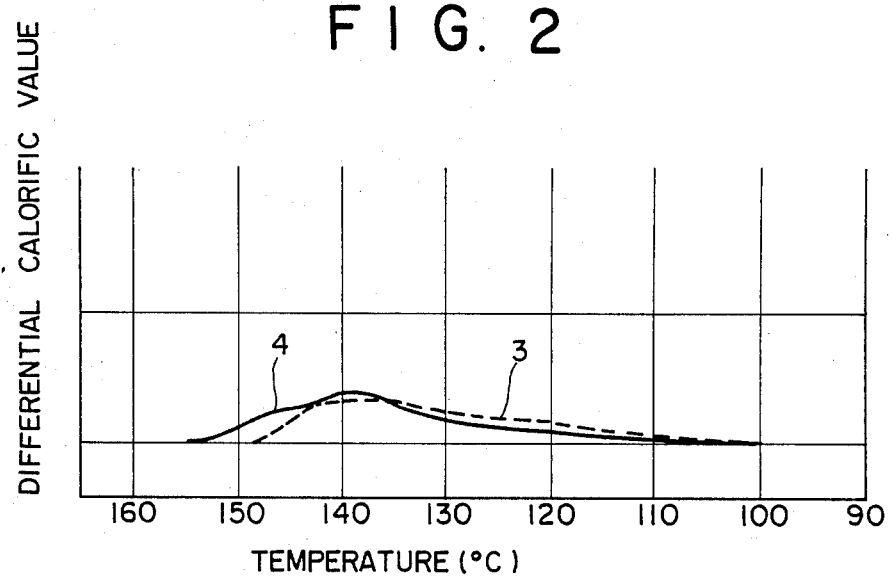

In the drawings:

FIGS. 1 and 2 are DSC curves of the expanded particles obtained in Example 8 and Comparative Example 4, respectively.

EXAMPLES 1-3

300 Grams of unexpanded particles formed of a polymer indicated in Table 1 below were charged into a 2100 ml autoclave, with which were mixed 1350 ml of water and 1 g of finely divided aluminum oxide to form a dispersion. The dispersion was heated to an expansion temperature shown in Table 1 at a rate of 5° C./min with stirring and maintained at that temperature for 60 min. A blowing agent (air or nitrogen gas) was then fed to the autoclave until the pressure within the autoclave had the value shown in Table 1 and the dispersion was maintained at that condition for another 60 min. Then the autoclave was opened to discharge the dispersion therefrom at an average rate of 1.5 Kg/min/mm$^2$ while maintaining the pressure therewithin unchanged, whereby the particles were expanded and foamed. The expanded particles had an apparent expansion ratio shown in Table 1 and were substantially constituted from closed cells. The quality of the expanded particles and their cells were evaluated to give the results shown in Table 1. The apparent expansion ratio, quality of the expanded particles and quality of cells were tested as follows:

(1) Apparent Expansion Ratio

The expanded particles continuously discharged from the autoclave are occasionally sampled at a predetermined interval for measurement of the apparent expansion ratio. The maximum and minimum values as obtained are shown in Table 1.

(2) Quality of Expanded Particles

The shape and size of the particles and the degree of shrinkage are examined and evaluated according to the following rating:

| | |
|---|---|
| Spheres free from deformation or shrinkage and having a uniform particle size | Good |
| Particles containing a small amount of deformed and shrunk particles and having a non-uniform particle size | Fair |
| Particles containing a large amount of deformed and shrunk particles and having a non-uniform particle size | Poor |

(3) Quality of Cells

The cross-sections of expanded particles were observed with a microscope to evaluate the quality of cells according to the following rating:

| | |
|---|---|
| Cells free from roughness in cell walls and having a uniform cell size | Good |
| Cells having slight roughness and slightly non-uniform cell size | Fair |
| Cells having considerable roughness and non-uniform cell size | Poor |

COMPARATIVE EXAMPLES 1-3

Expanded particles were produced in the same manner as described in above Examples except that an organic blowing agent indicated in Table 1 was used in place of the nitrogen-containing inorganic gas. Because of inflammability of butene, much care had to be taked in the expansion step. Further, the use of the organic blowing agent, which is more expensive than the inorganic gas, was disadvantageous from the economic point of view. The apparent expansion ratio, quality of expanded particles and their cells are also shown in Table 1.

TABLE 1

| | Polymer particles | Blowing agent | Expansion temperature (°C.) | Pressure within autoclave (Kg/cm$^2$G) | Apparent expansion ratio | Quality of particles | Quality of cells |
|---|---|---|---|---|---|---|---|
| Example | | | | | | | |
| 1 | Ethylene-propyrene random copolymer (ethylene content: 3 wt. %) | nitrogen gas | 148 | 45 | 10-11 | good | good |
| 2 | Low-density polyethylene (gel content 52%) | nitrogen gas | 150-152 | 60 | 7-8 | good | good |
| 3 | Linear low-density polyethylene | air | 150 | 46 | 5-6 | good | good |
| Comparative Example | | | | | | | |
| 1 | Same as in Example 1 | butane | 170-175 | 28 | 8-43 (blocking) | poor | poor |
| 2 | Same as in Example 2 | butane | 150-152 | 25 | 9-50 (blocking) | poor | poor |
| 3 | Same as in Example 3 | dichlorofluoromethane | 150 | 30 | 8-28 | fair | poor |

EXAMPLES 4-7

1000 Grams of unexpanded particles formed of a polymeric material indicated in Table 2, 3000 g of water, 3 g of finely divided aluminum oxide, 100 g of air and a quantity of an impregnating aid indicated in Table 2 were mixed in a 4950 ml autoclave to form a dispersion. The dispersion was heated to a predetermined temperature indicated in Table 2 at a rate of 5° C./min with stirring and then maintained at that temperature for 60 min. While maintaining the pressure within the autoclave at 45 Kg/cm$^2$ by feeding nitrogen gas thereto, the autoclave was opened to discharge the dispersion therefrom to an open atmosphere, whereby the polymer particles were expanded. The expanded particles thus obtained had an apparent expansion ratio as shown in Table 2 and were substantially constituted from closed cells.

the expansion operation. The dispersion was then maintained at an expansion temperature shown in Table 3 for another 30 min. The autoclave was subsequently opened to discharge the dispersion therefrom to an open atmosphere thereby the propylene particles were expanded. The expanded particles thus obtained had an expansion ratio as shown in Table 3.

The resulting expanded particles were held in an air-pressurized atmosphere so that the pressure within the cells thereof became 1.5 Kg/cm$^2$. The expanded particles with their cells being charged with pressurized air were then filled in a mold (300 mm × 300 mm × 50 mm) and heated with pressurized steam of 3.5 Kg/cm$^2$G for the further foaming of the expanded particles, thereby to obtain a molded article with an expansion ratio shown in Table 3. The molded articles obtained in Examples 8-11 showed no or almost no shrinkage (below 4%) in a direction parallel with the mold

TABLE 2

| Example | Polymer particles | Impregnating aid Kind | Impregnating aid Amount (g) | Expansion temperature (°C.) | Apparent expansion ratio (average) |
|---|---|---|---|---|---|
| 4 | Low-density polyethylene (gel content 52%) | Acetone | 50 | 150° C. | 20 |
| 5 | Low-density polyethylene (gel content 52%) | Heptane | 20 | 150° C. | 20 |
| 6 | Ethylene-propylene random copolymer (ethylene content: 3 wt. %) | Acetone | 50 | 150° C. | 29 |
| 7 | Ethylene-propylene random copolymer (ethylene content: 3 wt. %) | Heptane | 20 | 150° C. | 33 |

EXAMPLES 8-11

1000 Grams of unexpanded particles formed of a non-crosslinked polypropylene resin shown in Table 3, 3000 g of water and 3 g of finely divided aluminum oxide were mixed in a 5 liter autoclave to form a dispersion. The dispersion was heated to a temperature (secondary crystals-forming temperature) shown in Table 3 with stirring and maintained at that temperature for 30 min with stirring for the formation of secondary crystals. After the resulting dispersion was heated to a maximum temperature shown in Table 3, nitrogen gas or air was fed to the autoclave until the pressure within the autoclave reached to a pressure shown in Table 3. The autoclave was maintained at that pressure throughout and had an excellent dimensional stability.

In Table 3, the abbreviations E/P and B/P mean ethylene/propylene and butene/propylene random copolymers, respectively. The numerals in the parentheses immediately after the abbreviations E/P and B/P indicate ethylene and butene contents in terms of wt %, respectively.

COMPARATIVE EXAMPLES 4-6

Expanded particles were obtained and subjected to molding in the same manner as in Examples 8-11 except that the dispersion was heated directly to the maximum temperature without being subjected to the secondary crystals-forming treatment. The expansion conditions and the results were as shown in Table 3.

TABLE 3

| | Polypropylene resin Kind | Melting point (°C.) | Melt completion Temp. (°C.) | Secondary crystals-forming Temp. (°C.) | Maximum Temp. (°C.) | Expansion Temp. (°C.) | Secondary crystals | Blowing agent | Pressure within autoclave (Kg/cm$^2$G) | Apparent expansion rate (average) | Expansion rate of foamed article |
|---|---|---|---|---|---|---|---|---|---|---|---|
| Example | | | | | | | | | | | |
| 8 | E/P (3.5) | 139 | 153 | 150 | 155 | 155 | exist | N$_2$ | 60 | 10 | 10 |
| 9 | E/P (2.6) | 144 | 155 | 150 | 153 | 153 | exist | air | 70 | 12 | 12 |
| 10 | E/P (4.5) | 138 | 153 | 150 | 155 | 155 | exist | N$_2$ | 40 | 8 | 8 |
| 11 | B/P (20) | 142 | 152 | 150 | 150 | 150 | exist | N$_2$ | 40 | 8 | 8 |
| Comparative Example | | | | | | | | | | | |
| 4 | E/P (3.5) | 139 | 153 | — | 155 | 155 | not exist | N$_2$ | 60 | 6 | * |
| 5 | E/P | 139 | 153 | — | 137 | 137 | exist | N$_2$ | 60 | 1.2 | * |

TABLE 3-continued

| | Polypropylene resin | | | Secondary crystals-forming Temp. (°C.) | Maximum Temp. (°C.) | Expansion Temp. (°C.) | Secondary crystals | Blowing agent | Pressure within autoclave (Kg/cm²G) | Apparent expansion rate (average) | Expansion rate of foamed article |
|---|---|---|---|---|---|---|---|---|---|---|---|
| | Kind | Melting point (°C.) | Melt completion Temp. (°C.) | | | | | | | | |
| 6 | (3.5) E/P (2.6) | 144 | 155 | — | 160 | 153 | not exist | $N_2$ | 60 | 4 | * |

*Impossible to mold

Whether or not the expanded particles which were obtained in Examples 8–11 and Comparative Examples 4–6 contained secondary crystals was tested by a differential scanning calorimeter DT-30 (manufactured by Shimadzu Mfg. Co., Ltd.). FIGS. 1 and 2 are DSC curves of the expanded particles of Example 8 and Comparative Example 4, respectively, in which the curves 1 and 3 by dotted lines represent first DSC curves while curves 2 and 4 by solid lines are second DSC curves. The curve 1 in FIG. 1 has a high temperature peak at about 160° C. in addition to a characteristic peak at about 136° C., indicating the presence of secondary crystals in the expanded particles of Example 8. The curve 3 in FIG. 2 has merely a characteristic peak at about 137° C., showing that no secondary crystals exist in the expanded particles of Comparative Example 4. The absence of a high temperature peak in curve 3 is ascribed to the omission of the secondary crystals-forming treatment. The high temperature peak disappears in the second DSC curve 2 of FIG. 1. As described previously, the point P (139° C.) at which the second DSC curve 2 becomes maximum is the melting point of the resin and the point Q (153° C.) at which the second DSC curve 2 reaches to the base line represents the melt-completion temperature.

We claim:

1. A process for the production of expanded particles, comprising the steps of:
   (a) providing unexpanded particles formed of a semi-crystalline polymeric material;
   (b) contacting a nitrogen-containing inorganic gas with the unexpanded particles under a pressurized condition to impregnate the unexpanded particles with said gas, heating the unexpanded particles to a first temperature higher than the softening point of the polymeric material and dispersing the unexpanded particles in a liquid dispersing medium, so that a dispersion maintained at a first pressure and containing the softened, gas-impregnated, unexpanded particles is obtained; and
   (c) subjecting said dispersion to a second pressure lower than said first pressure so that the unexpanded particles are expanded.

2. A process as claimed in claim 1, wherein said polymeric material is a polyolefin resin.

3. A process as claimed in claim 1, wherein said nitrogen-containing inorganic gas is air or nitrogen gas.

4. A process as claimed in claim 1, wherein said liquid dispersion medium is water, ethylene glycol, glycerin, methanol, ethanol or a mixture thereof.

5. A process as claimed in claim 1, wherein said liquid dispersion medium is water.

6. A process as claimed in claim 1, wherein said liquid dispersion medium is used in an amount of at least 1.5 parts by weight per part by weight of the unexpanded particles.

7. A process as claimed in claim 1, wherein step (b) is performed in the presence of finely divided solid particles.

8. A process as claimed in claim 7, wherein said finely divided solid particles are finely divided particles of aluminum oxide, titanium oxide, basic magnesium carbonate, basic zinc carbonate, calcium carbonate or urea-formaldehyde resins.

9. A process as claimed in claim 1, wherein said first temperature is one between temperatures 30° C. lower and 40° C. higher than the melting point of the polymeric material when the polymeric material is a non-crosslinked crystalline polymeric material, between temperatures 20° C. lower and 120° C. higher than the melting point of the polymeric material when the polymeric material is a crosslinked, crystalline polymeric material, and between temperatures 10° C. higher and 120° C. higher than the melting point of the polymeric material when the polymeric material is an amorphous polymeric material.

10. A process as claimed in claim 1, wherein said first pressure is at least 20 atm (absolute).

11. A process as claimed in claim 1, wherein step (b) is performed in the presence of an impregnating aid capable of plasticizing the polymeric material and having a boiling point of −50° to 200° C.

12. A process as claimed in claim 11, wherein the impregnating aid is acetone, toluene, xylene, heptane, ethyl ether, dioxane, methyl acetate, ethyl acetate, tetrahydrofuran, a styrene monomer, an isoprene oligomer, dipentene or a mixture thereof.

13. A process as claimed in claim 11, wherein the impregnating aid is used in an amount of 0.5 to 30 parts by weight per 100 parts by weight of the unexpanded particles.

14. A process as claimed in claim 1, wherein, in step (b), the unexpanded particles are also contacted with an organic blowing agent for impregnation therewith in addition to the nitrogen-containing inorganic gas.

15. A process as claimed in claim 14, wherein the organic blowing agent is used in an amount of 2 to 200 parts by weight per 100 parts by weight of the nitrogen-containing inorganic gas.

16. A process as claimed in claim 1, wherein step (b) includes dispersing the unexpanded particles in the liquid dispersion medium in a closed contact zone, feeding the nitrogen-containing inorganic gas to the zone, and heating the dispersion to said first temperature.

17. A process as claimed in claim 16, wherein step (c) includes opening said closed contact zone to discharge the dispersion therefrom to an atmosphere maintained at said second pressure.

18. A process as claimed in any one of claims 1 through 15, wherein the polymeric material is a non-crosslinked polypropylene resin and the unexpanded particles to be expanded in step (c) contain secondary crystals of the polypropylene resin.

19. A process as claimed in claim 18, wherein step (b) includes dispersing the unexpanded particles in the liquid dispersing medium in a contact zone, maintaining the dispersion at a second temperature which is lower than the first temperature and for a period of time so that the secondary crystals of the polypropylene resin are formed, then heating the dispersion to said first temperature and feeding the nitrogen-containing inorganic gas to said zone while preventing the secondary crystals from being completely destroyed, whereby the unexpanded particles to be expanded in step (c) contains the secondary crystals of the polypropylene resin.

20. A process as claimed in claim 19, wherein said second temperature is between the melting point and the melt-completion temperature of the polypropylene resin.

21. A process as claimed in claim 20, wherein the first temperature is higher than the melt-completion temperature.

22. A process as claimed in claim 18, wherein step (b) includes dispersing the unexpanded particles in the liquid dispersing medium in a closed contact zone, feeding the nitrogen-containing inorganic gas to the zone, heating the dispersion to said first temperature which is between the melting point and the melt-completion temperature of the polypropylene resin, and maintaining the dispersion at said first temperature for a period of time sufficient to form the secondary crystals of the polypropylene resin, whereby the unexpanded particles to be expanded in step (c) contains the secondary crystals.

23. A process as claimed in claim 18, wherein the non-crosslinked polypropylene resin is a random copolymer having a propylene content of at least 50 weight %.

24. A process as claimed in claim 23, wherein the random copolymer is a propylene-ethylene random copolymer or a propylene-butene random copolymer.

* * * * *